May 7, 1935.  W. H. HERDLEIN  2,000,841
APPARATUS FOR CONDITIONING AIR
Filed June 20, 1933  3 Sheets-Sheet 1
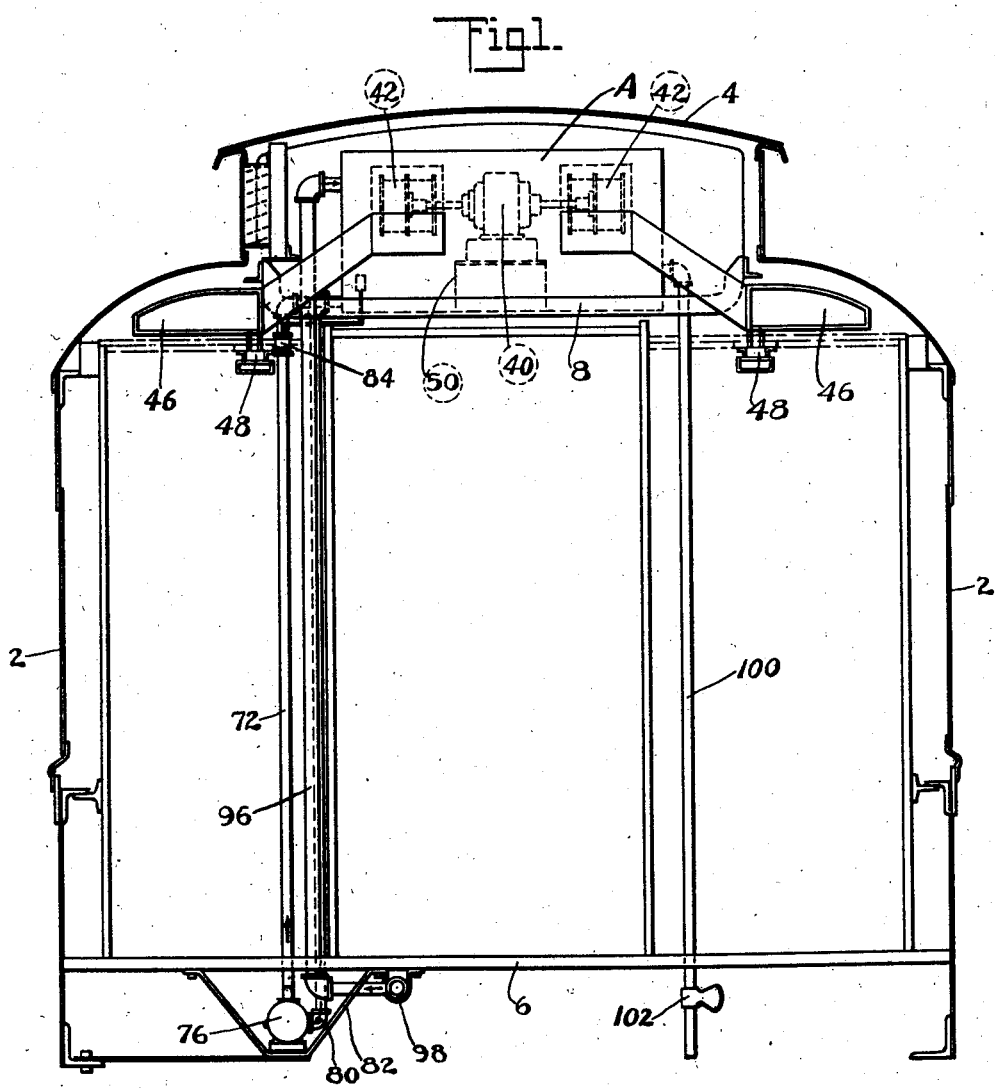
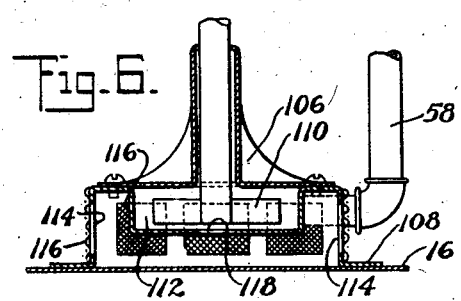
INVENTOR
Wallace H. Herdlein
BY
ATTORNEY

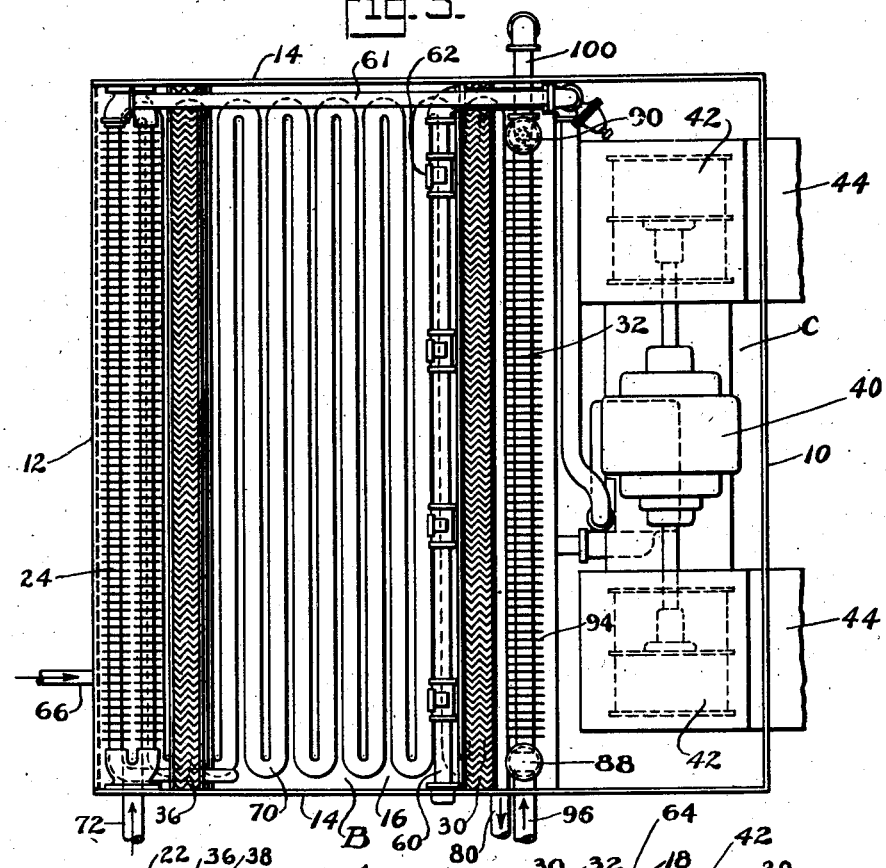
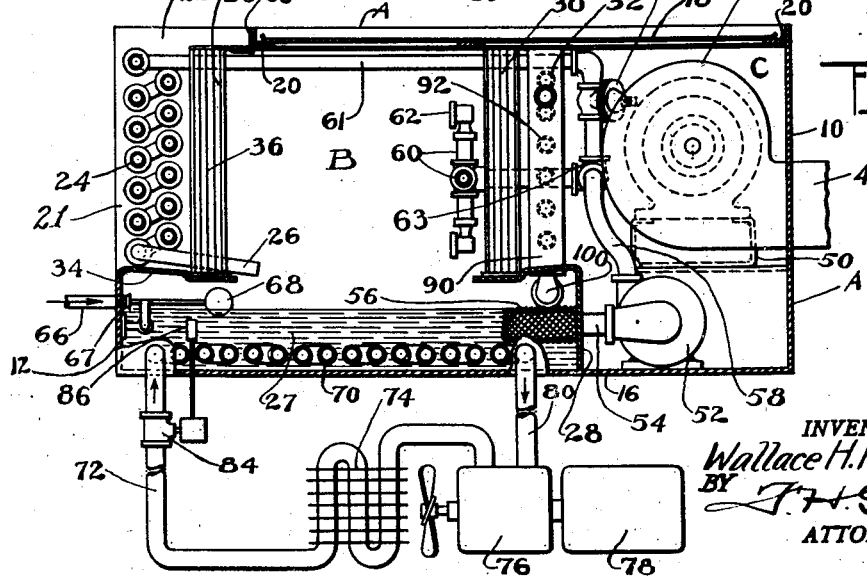

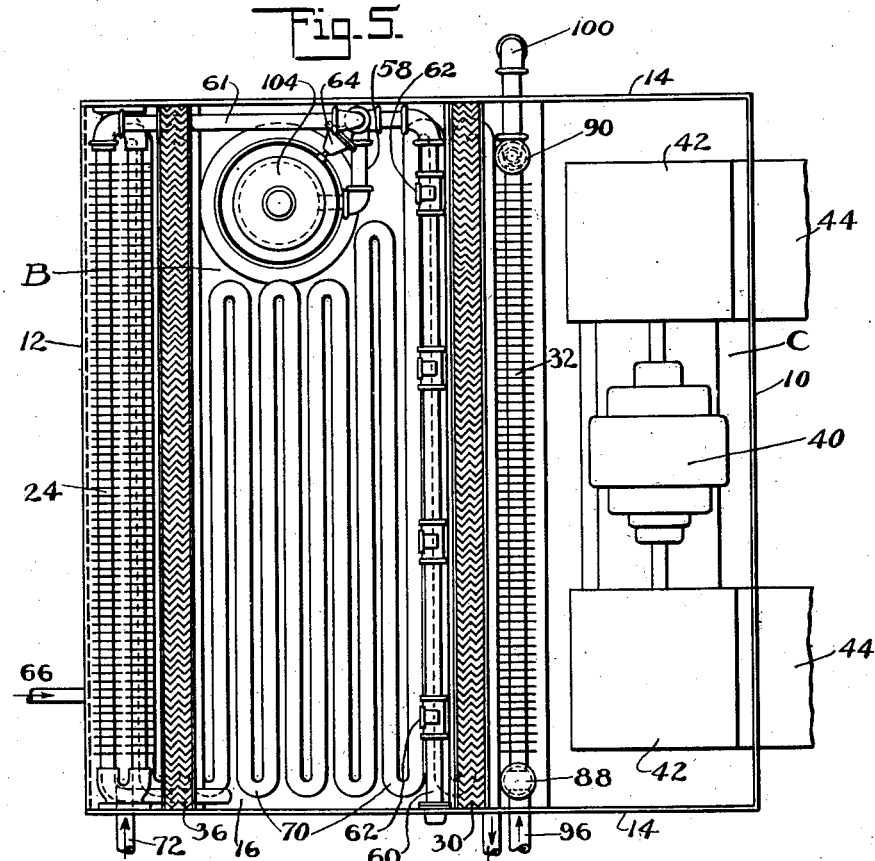
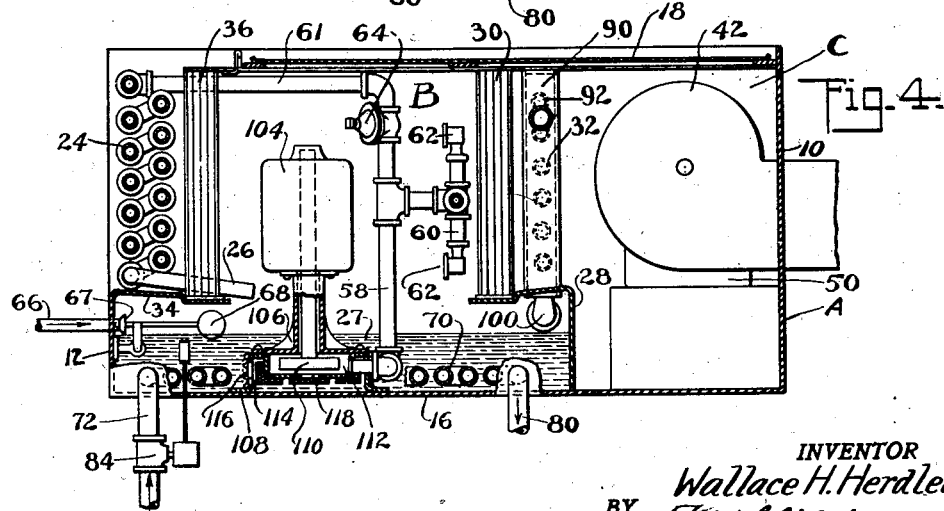

Patented May 7, 1935

2,000,841

UNITED STATES PATENT OFFICE 2,000,841

APPARATUS FOR CONDITIONING AIR

Wallace H. Herdlein, St. Louis, Mo., assignor to American Car and Foundry Company, New York, N. Y., a corporation of New Jersey Application June 20, 1933, Serial No. 676,701

9 Claims. (Cl. 257—7)

This invention relates to air conditioning systems for railway passenger cars and has for one object the provision of a simple and comparatively inexpensive, compact construction which may be arranged within a passenger car without extensive modifications or alterations in the structure thereof, the system being operative to withdraw air from the passenger compartment of the railway car and temperature condition such air and then re-circulate it through the passenger compartment.

Another object of this invention is the provision of an air conditioning system for railway passenger cars in which the use of water ice is eliminated for the purpose of cooling air withdrawn from the passenger compartment of the car; the present system comprising a mechanical system for furnishing the desired low temperature required for cooling the air.

Still another object of this invention is the provision of an air conditioning system in which air is withdrawn from the passenger compartment of a railway car and initially cooled and then subjected to the action of water sprays for the purpose of washing and humidifying the air prior to its re-circulation into the passenger compartment.

It is known that dehumidification of air depends upon relative temperatures. For example, when air is forced into a particular area or zone, the moisture content thereof may be removed or reduced by subjecting such air to a medium which is lower in temperature than said air. Subjecting the air to the action of cooling coils may or may not dehumidify the air dependent upon relative temperatures of the air and cooling coils. Dehumidification is distinguished from the removal of entrained moisture from air and may be effected by subjecting air to the action of spray water which is at a temperature considerably lower than that of the air. In practice, it has been found that air may be dried or, in other words, dehumidified by water sprayed thereinto at a temperature between 40° and 50° Fahrenheit. In view of this, another object of this invention is the provision of an air conditioning system for railway passenger cars in which air from the passenger compartment of the car is initially cooled and then subjected to the action of water at a relatively low temperature for the purpose not only of washing the air or removing entrained foreign matter such as dust therefrom, but also for the purpose of dehumidifying said air prior to its recirculation into the passenger compartment of the railway car.

A further object of the present invention is the provision of an air conditioning system for railway passenger cars, or the like, in which the parts thereof are easily accessible for replacement or repair and in which the cooling effect on the air is produced by water cooled to a pre-determined or required degree by mechanical means; the system being so arranged and formed that a minimum supply of water is maintained for producing the desired functions.

A still further object of this invention is the provision of an air conditioning system which is simple in construction and includes, in the main, an air conditioning cabinet having provisions for cooling, washing, humidifying or dehumidifying, and then, if desired and necessary, heating the air prior to its re-circulation into the passenger compartment of the car.

Other objects and advantages of this invention will be apparent from the following description taken in conjunction with the accompanying drawings in which:

Figure 1 is a more or less diagrammatic view through a railway passenger car showing the present system installed therein;

Fig. 2 is a sectional view through the air conditioning cabinet, the view also showing the mechanical means for effecting cooling of the water in the cabinet;

Fig. 3 is a top plan view of the air conditioning cabinet with the top or cover thereof removed;

Fig. 4 is a sectional view through the air conditioning cabinet of the present invention showing a modified construction;

Fig. 5 is a top plan view of the construction shown in Fig. 4 with the top or cover of the cabinet removed, and Fig. 6 is an enlarged detail sectional view of a portion of the construction shown in Fig. 4 showing the arrangement of the impeller and the motor supporting base.

Referring now more particularly to the drawings in which similar characters of reference designate similar parts in the several views, the car shown more or less diagrammatically in the drawings is of the conventional monitor deck type and includes side walls 2, a roof 4 and a floor 6. Supported on brackets 8 arranged adjacent the roof 4 is the air conditioning cabinet forming a part of the present invention and indicated generally at "A".

In the form of the invention shown in Figs. 2 and 3 the cabinet "A" comprises a substantially box-like structure having front and rear end walls 10 and 12 respectively, side walls 14, a bottom 16 and a removable top or cover 18 supported on brackets 20, one of the latter being attached to the front end wall 10 while the other bracket 20 extends transversely across the cabinet "A" at a point intermediate the front and rear end walls as clearly shown in Fig. 2. The front wall 10 extends the full height of the cabinet, while the rear end wall 12 extends only part way of the height of the cabinet so that the rear portion of the cabinet is open between the side walls as shown at 21 to permit easy entrance of air into the cabinet. The cover 18 does not extend the full length of the cabinet as clearly shown in Fig. 2 and thus the cabinet is provided with an air entrance opening 22 through the upper portion thereof. In other words, the construction shown and described provides for the free entrance of air into the cabinet not only through the opening 22 in the top thereof, but also through an enlarged opening 21 above the wall 12 between the opposite side walls of the cabinet. Arranged adjacent the rear end wall 12 of cabinet "A" is a heat exchange coil 24 which, in the instance shown, is a cooling coil as will be more fully described hereinafter, having a discharge end 26 for discharging water from the coil into the cabinet, more particularly into a water reservoir or sump 27 therein defined between the rear end wall 12 and a supporting bracket 28 which extends between the side walls 14 and is secured thereto and to the bottom 16 in any suitable or desired manner as by welding, and serves as a support for eleminator plates 30 and for a heating coil 32. Secured to the rear end wall 12 of cabinet "A" and projecting into the cabinet is a bracket 34 which supports the heat exchange coil 24 and eliminators 36 arranged adjacent the coil 24 and in line with the air entrance opening 22. The eliminators 36 are also supported at their upper end portions by a bracket 38 to which the adjacent cover support bracket 20 is secured as clearly shown in Fig. 2.

From the description so far it can be seen that the eliminator support 28 and its associated eliminator 30 divides the cabinet "A" into a chamber "B", arranged between eliminators 30 and 36 and a blower chamber "C" in which latter is positioned a driving motor 40 for actuating blowers or fans arranged in spaced housings 42 and adapted to force air from the blower chamber "C" through discharge outlets 44 into ducts 46 arranged adjacent the roof 4 of the car and extending longitudinally and provided with air discharge elements 48 for discharging air into the passenger compartment of the car. The motor 40 is supported in any suitable or desired manner in the blower chamber "C" and, in the instance shown, is supported on a mount 50.

Arranged within the blower chamber "C" and supported by the bottom 16 of cabinet "A" is a water pump 52 connected with the sump 27 by an inlet pipe 54 which may be extended into the sump 27 and provided with a screen or filter 56; operation of the pump serving to draw water from the sump 27 and force it through a feeding pipe 58 into spray pipes 60 having spray nozzles 62 adapted to spray water into the air passing through the cabinet in a direction opposite the direction of movement of said air. The feeding pipe 58 also is adapted to force water to the heat exchange coil 24 through a delivery pipe 61 coupled to pipe 58 as shown at 63 and having an adjustable pressure relief valve 64 therein. This valve 64 is designed to operate in response to variations in pressure in the pipe 58. The pump 52 is actuated by a motor and, as is well known, the voltage fluctuates, for example, from 27 up to 38 volts. In practice the pump is designed to have a capacity sufficient to supply water to the sprays when said motor is operated at approximately 32 volts and the valve 64 is adjusted so as to remain closed at the pressure developed at this voltage and the motor speed. When the voltage drops the valve 64 remains closed and the pressure on the sprays 62 is also reduced; however, when the voltage ranges above the normal, 32, and up to 37 or 38 volts for example, the valve 64 will be actuated and opened because of the increased pressure of the water in the pipe 58 which results from the increase in motor speed. When the valve 64 is in open position it will be apparent that the pressure in pipe 58 remains constant at the predetermined pressure best suited for satisfactory operation of the sprays. This means that although the voltage may range up to a relatively high point the increased load on the motor is negligible and application of this type of valve avoids the necessity of a troublesome and expensive voltage regulator and also permits passage of cooling medium to the heat exchange coil 24. The motor for operating pump 52 may be of the multi-speed type and any means well known in the art, such for example as a rheostat, may be utilized for obtaining and controlling the desired motor speed. In air conditioning systems using water sprays it is desirable that the water issuing from the spray nozzles be in the form of a fine spray but if the water carried to the nozzles be under an excessive pressure the water will issue from the nozzles in the form of an excessively fine spray or mist and it would be almost impossible to separate the finely divided water particles in suspension from the air flowing through the spray chamber. Due to the provision of the valve 64 which opens in response to predetermined pressure in pipe 58 the water issuing from the nozzles 62 is always maintained in the form of a fine spray instead of a too finely divided spray or mist.

To replenish the water in sump 27, as is, of course, necessary at times, a water supply pipe 66 extends through the rear end wall 12 of the cabinet and is provided with a valve 67 operated by a float 68. Obviously, decrease in the water supply in sump 27 will cause the float 68 to operate the valve controlling admission of water through pipe 66 into the sump.

Arranged within the sump 27 and supported in any suitable or desired manner is an evaporator coil 70 the inlet end of which is connected to a pipe 72 leading from a condenser 74 which receives a suitable refrigerant from a compressor 76 actuated by a motor 78. The outlet end of coil 70 is connected by a low pressure line in the form of a pipe 80 which leads to the compressor 76. In practice, the compressor 76, motor 78 and condenser 74 are suspended beneath the floor 6 of the car in any suitable manner, as for example, by brackets 82. The compressor, condenser and motor are illustrated diagrammatically in the drawings inasmuch as they may be of any preferred or desired construction; this invention not being directed to the specific construction of such elements. Pipe 72 is the high pressure line of the refrigerant circuit just described and a thermostatically operated expansion valve 84 is provided therein which is operated in response to temperature conditions of the water in sump 27 by means of the thermostat 86.

The heating coil 32 supported by bracket 28 comprises entrance and exhaust headers 88 and 90 respectively connected by steam pipes 92 which are provided with fins 94 for increasing the effective areas thereof. The steam entrance header 88 receives steam through a pipe 96 connected at its lower end with the main steam line 98 of the car as shown more clearly in Fig. 1. Connected with the exhaust header 90 is a discharge pipe 100 the lower end of which is arranged below the floor 6 of the car and is provided with a trap 102 of any preferred or desired construction, all as indicated clearly in Fig. 1.

In the form of the invention shown in Figs. 2 and 3 the pump 52, which is operated by a suitable motor, is arranged within the blower chamber "C". In the form of the invention shown in Figs. 4 and 5 a motor 104 is arranged within the spray chamber "B" and is supported on a bracket 106 mounted on a base 108 secured to the bottom 16 of cabinet "A"; the motor 104 driving an impeller 110 arranged within a well 112 formed in the base 108 as clearly shown in Fig. 4. The base 108 is provided with suitable openings 114 for permitting passage of the water from the sump 27 into said base, said openings 114 being covered by screening 116. The well 112 is provided with an opening 118 for permitting the discharge of water from within the base 108 into the well for passage into the pipe 58.

Referring to the form of the invention shown in Figs. 2 and 3 it can be seen that with water in the reservoir 27 and the refrigeration unit in operation the water is maintained in a cool condition. The thermostat 86 may be adjusted so as to maintain the water at any desired or pre-determined temperature; such temperature during use of the apparatus in warm weather being preferably between 40° and 50° Fahrenheit. Operation of the motor 40 actuates the fans in housings 42 to draw air from the passenger compartment into the cabinet, the air first contacting with the heat exchange coil 24 whereby it is initially cooled and then passing through the eliminators 36 into the spray chamber "B" where it is subjected to the action of water from the spray nozzles 62 thus washing the air. As will be apparent from the drawings the pump 52 causes circulation of water from the reservoir 27 to the spray nozzles and spray chamber. The water washes the air and is at a temperature sufficiently low as to dehumidify the air passing through the spray chamber "B". Following washing and dehumidification the air is drawn by means of the fans through the eliminators 30 into the blower chamber "C" and is then forced into the passenger compartment of the car through the conduits 44.

The apparatus has been described from the standpoint of its use during warm weather, but it will be understood that its use during cold weather is equally satisfactory. The thermostat 86 may be adjusted so that the water in reservoir 27 is maintained at a temperature such that it will not dehumidify the air as it passes through the spray chamber, this temperature being in excess of 50° Fahrenheit. During cold weather steam is admitted to the heat exchange coil 32 to heat the air after it has been cooled by the heat exchange coil 24 and washed in the spray chamber "B", the spray devices providing conveniently the excess of moisture which enables the air to supply the deficiency in humidity which would otherwise be caused by the increase in temperature in air by the heating coil 32.

It can be seen from the above description that the system and apparatus of the present invention is extremely flexible in that it may be satisfactorily operated during different seasons of the year to maintain the air within the passenger compartment of a railway car in any pre-determined or desired condition. During the passage of the air through the cabinet the pump 52 conducts the water from the reservoir through the pipe 58 to the spray nozzles 62 and, upon increase in pressure within the pipe 58, the valve 64 will be operated to permit passage of water through pipe 61 to the heat exchange coil 24 thereby providing the means for initially cooling the air immediately upon its entrance into the cabinet. The heat exchange coil 32 is adapted to receive steam from the main steam line of the car and, within the spirit of this invention, the passage of the steam to the coil 32 may be controlled automatically and in response to temperature conditions within the passenger compartment of the car as by providing a valve suitably positioned with respect to the coil 32 and controlled in response to movements of a thermostat arranged within the passenger compartment of the car. Inasmuch as the automatic means for controlling the admission of steam to a heat exchange coil is well known the same is not illustrated in the drawings.

In the form of the invention shown in Figs. 4 and 5 the operation described above is present. In the construction of the apparatus shown in these Figs. 4 and 5 the means for forcing water to the spray nozzles and cooling coil 24 comprises the impeller member arranged within the spray chamber and suitably supported and having a motor 104 driven from any suitable source of electric supply.

The drawings disclose certain embodiments of the invention but it is to be understood they are for illustrative purposes only and various changes in the form and proportions of the construction shown may be made within the scope of the appended claims and without departing from the spirit of the invention.

What is claimed is:

1. In an air conditioning apparatus, a cabinet, means in said cabinet which divide the latter into a blower chamber and a combined spray chamber and water reservoir, blower means in the blower chamber for drawing air through the cabinet and for discharging said air out of the cabinet, spray devices in the spray chamber, a heat exchange coil in the cabinet adjacent the air inlet portion thereof, a pipe for conducting water from the reservoir to the spray devices and heat exchange coil, the latter having its discharge end arranged to discharge water into the reservoir, pump means for forcing water through the pipe to the spray devices and heat exchange coil, a valve in said pipe operative in response to variations in pressure in the pipe for controlling passage of water to the heat exchange coil, and means for circulating a refrigerant through the water reservoir comprising a compressor and a cooling coil connected therewith and having a portion thereof arranged in said reservoir.

2. Apparatus for conditioning the air in a railway passenger car comprising an air conditioning cabinet arranged within the car and formed to provide a spray chamber and a water reservoir within said cabinet, means for circulating a refrigerant including a refrigerating coil in the water reservoir, spray devices in the spray chamber, pump means within the spray chamber adjacent the reservoir for circulating water from the reservoir to the spray devices, said cabinet having air inlet and air outlet means, a heat exchange coil adjacent the air inlet, means connecting the spray devices and heat exchange coil permitting excess water supplied to the spray devices to flow through said coil, and means arranged between the spray chamber and air outlet means for drawing air through the air inlet means and through the spray chamber and then through the air outlet means into the passenger compartment of the car.

3. Apparatus for conditioning the air in a railway passenger car comprising an air conditioning cabinet arranged within the car and having spaced bracket members therein extending between opposite side walls thereof, at least one of said bracket members being secured to the bottom of the cabinet whereby to cooperate with the opposite side walls and bottom of said cabinet to provide one wall of a water reservoir, eliminators supported by each of said brackets, said eliminators being arranged in spaced relation and defining a spray chamber therebetween, said spray chamber being in direct communication with the water reservoir, a heat exchange coil arranged between one of said eliminators and the adjacent end wall of the cabinet, spray devices in the spray chamber, a pipe for conducting water from the reservoir to the spray devices and to said heat exchange coil, the latter having one end thereof discharging into said water reservoir, pump means for forcing water from the water reservoir through the pipe to the spray devices and heat exchange coil, means for circulating a refrigerant through the water reservoir comprising a compressor and a refrigerating coil connected therewith and having a portion thereof arranged within the water reservoir, and blower means in the cabinet for drawing air into contact with the heat exchange coil then through the spray chamber and out of said cabinet.

4. Apparatus for conditioning the air in a railway passenger car comprising an air conditioning cabinet in the car and formed to provide a spray chamber and a water reservoir therein, spray devices in the spray chamber, air inlet and air outlet means for the cabinet, a heat exchange coil at the air inlet portion of the cabinet, a conduit for passing water from the reservoir to the spray devices and heat exchange coil, pump means in the cabinet for forcing water through the conduit, a valve in said conduit operative in response to variations in pressure in said conduit for controlling the passage of water thereto to the heat exchange coil, blower means in the cabinet for drawing air through the cabinet and for discharging air into the passenger compartment of the car, a heat exchange coil arranged intermediate the spray chamber and blower means, and means for cooling the water in the reservoir comprising a refrigerating unit including a cooling coil arranged in the water reservoir and a compressor with which the cooling coil is connected.

5. In an air conditioning system of the character described, an air conditioning cabinet having spaced eliminators therein defining a spray chamber therebetween, said cabinet being so formed as to provide a water reservoir in communication with the spray chamber and said cabinet having air inlet and air outlet means, bracket means in said cabinet extending between opposite side walls thereof for supporting said eliminators, one of said bracket means forming one end wall of the water reservoir, a heat exchange coil at the air inlet portion of the cabinet and arranged between one of said eliminators and the adjacent end wall of the cabinet, a second heat exchange coil arranged between the air outlet portion of the cabinet and the adjacent eliminator, spray devices in the spray chamber, a pipe for conducting water from the reservoir to the spray devices and the heat exchange coil at the air inlet portion of the cabinet, means operative in response to variations in level of the water in said reservoir for feeding water to said reservoir, pump means for forcing water through the pipe to the spray devices and the heat exchange coil at the air inlet portion of the cabinet, means in said pipe for automatically controlling the passage of water therethrough to the heat exchange coil connected with said pipe, a compressor arranged outside of the cabinet, a refrigerating coil arranged in the water reservoir and submerged in the water therein, said coil being connected with the compressor, and valve means operative in response to variations in temperature conditions of the water in said reservoir for controlling passage of refrigerant through the refrigerating coils.

6. In an air conditioning system for railway passenger cars, an air conditioning cabinet having air inlet means and air outlet means and formed to provide a combined spray chamber and water reservoir, means for drawing air through the cabinet, spray devices in the spray chamber, pump means within the spray chamber and in front of the spray devices for forcing water from the reservoir to the spray devices, a heat exchange coil within the chamber, means connecting the spray devices and the heat exchange coil permitting excess water supplied the spray devices to flow through said coil, and refrigerant means adapted to maintain the water in the reservoir at a low temperature whereby to dehumidify the air when it is sprayed thereinto.

7. In an air conditioning system for railway passenger cars, an air conditioning cabinet having air inlet means and air outlet means and formed to provide a spray chamber therein, spray devices in the chamber, a water reservoir in said cabinet, means for drawing air from the passenger compartment into and through said cabinet, pump means within the spray chamber for forcing water from the reservoir to the spray devices, means associated with the spray devices adapted to prevent excessive pressure on the spray devices and refrigerant means adapted to cool the water in said reservoir to a point sufficient to cause it to dehumidify the air passing through the cabinet when sprayed thereinto.

8. In an air conditioning apparatus of the character described, in combination, a combined spray chamber and water reservoir in direct communication, an evaporator unit within said reservoir, spray devices within the chamber, means to circulate water from the reservoir to the spray devices, means associated with the spray devices adapted to prevent excessive pressure on the spray devices to thereby insure their proper functioning, and means to draw air through the spray and over the surface of the water in the reservoir.

9. In an air conditioning apparatus of the character described, in combination, a combined spray chamber and water reservoir in direct communication, an evaporator unit within said reservoir, spray devices within the chamber, means in said chamber and reservoir to circulate water from the reservoir to the spray devices, means associated with the spray devices adapted to prevent excessive pressure on the spray devices to thereby insure their proper functioning, and means to draw air through the spray and into surface contact with the water in the reservoir.

WALLACE H. HERDLEIN.